(12) United States Patent
MacDonald et al.

(10) Patent No.: US 12,263,848 B2
(45) Date of Patent: Apr. 1, 2025

(54) METHODS AND STRUCTURES TO EXTEND VEHICLE CONNECTIVITY

(71) Applicant: GM GLOBAL TECHNOLOGY OPERATIONS LLC, Detroit, MI (US)

(72) Inventors: Andrew J. MacDonald, Grosse Pointe Park, MI (US); Dipankar Pal, Sylvania, OH (US); Russell A. Patenaude, Macomb Township, MI (US); Matthew E. Gilbert-Eyres, Rochester, MI (US); Eric T. Hosey, Royal Oak, MI (US); Venkata Naga Siva Vikas Vemuri, Famington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 251 days.

(21) Appl. No.: 17/889,515

(22) Filed: Aug. 17, 2022

(65) Prior Publication Data
US 2024/0059298 A1   Feb. 22, 2024

(51) Int. Cl.
*B60W 40/09*   (2012.01)
*H04W 4/46*   (2018.01)

(52) U.S. Cl.
CPC .............. *B60W 40/09* (2013.01); *H04W 4/46* (2018.02); *B60W 2540/30* (2013.01)

(58) Field of Classification Search
CPC .... B60W 40/09; B60W 2540/30; H04W 4/46; H04W 4/80; H04W 48/16; H04W 76/10; Y02D 30/70
See application file for complete search history.

(56) References Cited

U.S. PATENT DOCUMENTS

| | | | |
|---|---|---|---|
| 11,202,190 B1* | 12/2021 | Yerli | H02J 7/0048 |
| 2017/0086045 A1* | 3/2017 | Lucero | H04W 76/50 |
| 2017/0164192 A1* | 6/2017 | Schussmann | H04W 12/041 |
| 2019/0245576 A1* | 8/2019 | Ehrentraut | H04W 4/90 |

OTHER PUBLICATIONS

"On the Potential of Bluetooth Low Energy Technology for Vehicular Applications" by J. Lin et al, IEEE Communications Magazine • Jan. 2015 pp. 267-275 (Year: 2015).*

* cited by examiner

Primary Examiner — Kito R Robinson
Assistant Examiner — Tanya C Sienko
(74) Attorney, Agent, or Firm — Quinn IP Law (57) ABSTRACT

A method of extending connectivity of a recipient vehicle may be executed by a non-transitory computer-readable medium. During an ignition off state of the recipient vehicle, the method includes disabling a recipient cellular network access device (NAD) of the recipient vehicle and connecting to a low power communications source. The method includes communicating with a centralized location over the low power communications source. The low power communications source may be a recipient Bluetooth® low energy (BLE) within the recipient vehicle. The method may include connecting to a donor vehicle proximate the recipient vehicle. The donor vehicle includes a donor NAD and a donor BLE, such that the donor NAD of the donor vehicle communicates with the centralized location on behalf of the recipient vehicle.

20 Claims, 5 Drawing Sheets

METHODS AND STRUCTURES TO EXTEND VEHICLE CONNECTIVITY

INTRODUCTION

The present disclosure relates to methods for extending connectivity of a vehicle during ignition off periods.

SUMMARY

A method of extending connectivity of a recipient vehicle is provided, which may be executed by a non-transitory computer-readable storage medium. During an ignition off state of the recipient vehicle, the method includes disabling a recipient cellular network access device (NAD) of the recipient vehicle and connecting to a low power communications source. The method also includes communicating with a centralized location over the low power communications source.

The low power communications source may be a recipient Bluetooth® low energy (BLE) device within the recipient vehicle. The method may include connecting to a donor vehicle proximate the recipient vehicle. The donor vehicle includes a donor NAD and a donor BLE device, such that the donor NAD of the donor vehicle communicates with the centralized location on behalf of the recipient vehicle.

Differing methods may be used to identify or search for the donor vehicle. For example, and without limitation, the recipient vehicle may determine whether the donor vehicle has sufficient telematic energy budget to operate the donor NAD, may identify the donor vehicle based on driver behavior predictions from the donor vehicle, or may determine whether there is a pattern-based donor vehicle regularly nearby in a specific location.

Where the recipient vehicle and the donor vehicle are from different manufacturers, or different manufacturer families, the methods may use vehicle-to-vehicle (V2V) negotiations to communicate with vehicles from a different manufacturer. The methods may also use V2V communications to determine whether the non-manufacturer donor is a candidate to use the donor NAD on behalf of the recipient vehicle. The methods may interrupt use of the donor NAD if, for example, the donor vehicle exceeds its telematic energy budget or the recipient vehicle exits the ignition off state.

The above features and advantages and other features and advantages of the present disclosure are readily apparent from the following detailed description of the best modes for carrying out the disclosure when taken in connection with the accompanying drawings.

DETAILED DESCRIPTION

Figure 1:
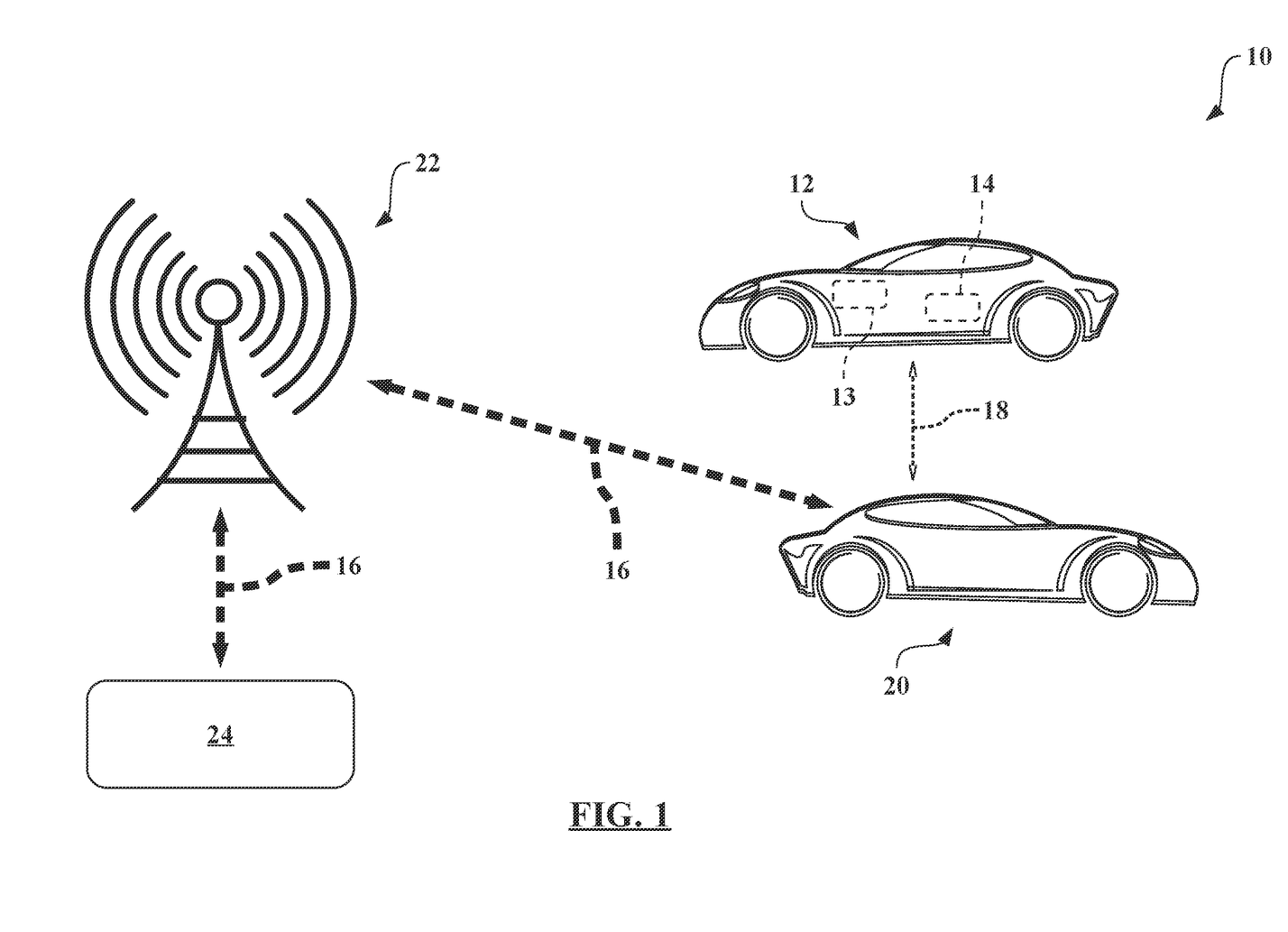
FIG. 1 is a schematic diagram of a connectivity network or connectivity system for extending vehicle connectivity of one or more recipient vehicles.

Referring to the drawings, like reference numbers refer to similar components, wherever possible. FIG. 1 schematically illustrates a connectivity network or connectivity system 10, which may be used to extend the connectivity of a recipient vehicle 12 during an ignition off state of the recipient vehicle 12.

Extending connectivity of the recipient vehicle 12 may be particularly useful during long ignition off periods for the recipient vehicle 12, such as, without limitation, greater than 10 days, but up to 40 days, or more. Extending connectivity of the recipient vehicle 12 may also prolong the life of a battery 13 within the recipient vehicle 12.

A generalized control system, computing system, or controller 14 is operatively in communication with relevant components of, at least, the recipient vehicle 12. The controller 14 includes, for example and without limitation, a non-generalized, electronic control device having a preprogrammed digital computer or processor, a memory, storage, or non-transitory computer-readable storage medium used to store data such as control logic, instructions, lookup tables, etc., and a plurality of input/output peripherals, ports, or communication protocols.

Furthermore, the controller 14 may include, or be in communication with, a plurality of sensors. The controller 14 is configured to execute or implement all control logic or instructions described herein and may be communicating with any sensors described herein or recognizable by skilled artisans. The controller 14 may be dedicated to the specific aspects of the recipient vehicle 12 described herein, or the controller 14 may be part of a larger control system that manages numerous functions of the recipient vehicle 12.

The battery 13 may be representative of several energy storage structures. The battery 13 may be a starting, lighting, and ignition (SLI) battery for a conventional or hybrid vehicle. Furthermore, the battery 13 may be representative of the larger battery packs of electric or hybrid vehicles. Note that, although not shown in FIG. 1, the donor vehicle 20 will also have a battery. For electric vehicles, or other vehicles, ignition off and power off may be considered substantially the same state.

Connectivity may be extended by connecting to a low power communications source. For example, and without limitation, the low power communications source may be a cellular phone (not shown in the figures) within the recipient vehicle 12. The low power communications source may use less power than, for example and without limitation, a recipient cellular network access device (NAD 16) of the recipient vehicle 12, such that the recipient NAD 16 may be disabled to extend the life of the battery 13.

Alternatively, the recipient vehicle 12 may utilize a low power communications source that is, for example and without limitation, a Bluetooth® low energy device 18 (alternatively, BLE device 18). Note that where the low power communications source is a cell phone within the recipient vehicle 12, the recipient vehicle 12 may utilize the BLE device 18 to communicate with the cellular phone.

The recipient BLE device 18 may communicate with a donor vehicle 20, that also includes a donor BLE device 18. The donor vehicle 20 is likely substantially proximate the recipient vehicle 12. Skilled artisans will recognize that different types of donor and recipient BLE devices 18 may be incorporated within both the recipient vehicle 12 and the donor vehicle 20.

The drawings and figures presented herein are diagrams, are not to scale, and are provided purely for descriptive purposes. Thus, any specific or relative dimensions or alignments shown in the drawings are not to be construed as limiting. While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The term vehicle is broadly applied to any moving platform. Vehicles into which the disclosure may be incorporated include, for example and without limitation: passenger or freight vehicles; autonomous driving vehicles; industrial, construction, and mining equipment; and various types of aircraft.

All numerical values of parameters (e.g., of quantities or conditions) in this specification, including the appended claims, are to be understood as being modified in all instances by the term "about," whether or not the term actually appears before the numerical value. About indicates that the stated numerical value allows some slight imprecision (with some approach to exactness in the value; about or reasonably close to the value; nearly). If the imprecision provided by about is not otherwise understood in the art with this ordinary meaning, then about as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

When used herein, the term "substantially" often refers to relationships that are ideally perfect or complete, but where manufacturing realities prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans will recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

In addition to the donor BLE device 18, the donor vehicle 20 includes a donor NAD 16, such that the recipient BLE device 18 communicates with the donor BLE device 18. The donor NAD 16—or, when in use, the recipient NAD 16—may communicate with a wireless network 22.

Therefore, the donor NAD 16 of the donor vehicle 20 may be used to communicate with a centralized location 24 on behalf of the recipient vehicle 12, such that the recipient vehicle 12 is communicating with the centralized location 24 over a low power communications source, such as the BLE device 18. Note that both the recipient and donor NAD 16 and the recipient and donor BLE device 18 use the same number, as the communications protocols may be generally the same, as would be recognized by skilled artisans.

The centralized location 24 may be, without limitation, a back office of the vehicle manufacturer. The back office may handle things like, without limitation, communicating with the recipient vehicle 12 to remote start the vehicle via a smart device application. This would allow the recipient vehicle 12 to be remote started—or to have other communications functions executed—without using the recipient NAD 16, such that the battery 13 uses less of its energy resources.

NAD 16 is used broadly of cellular or satellite-based communications systems that may be incorporated into the recipient vehicle 12 or the donor vehicle 20 for communications with the centralized location 24, such as the back office. These include, without limitation, 4G, 5G, satellite communications, or similar communications systems, as will be recognized by those having ordinary skill in the art. Note that either of the vehicles shown schematically in FIG. 1 may be the recipient vehicle 12 or the donor vehicle 20

The recipient vehicle 12, or the donor vehicle 20, may be able to turn on a DRx mode, i.e., Discontinuous Reception Mode, which generally refers to shutting down the remaining functions of the telematics module, and using, substantially or possibly, only the NAD 16, such that turning on the DRx mode may include using the NAD 16. However, on many occasions, the recipient NAD 16 may need to be completely turned off, such that even DRx mode is no longer supported based on the energy reserves of the battery 13. For example, and without limitation, there may be energy use budgets applied to the telematics module, such that after the telematics energy budget is spent, or exhausted, the recipient NAD 16 of the recipient vehicle 12 will need to be completely disabled to conserve power.

The recipient NAD 16 generally uses more energy than the recipient BLE device 18. Therefore, the BLE device 18 may be used, while using the donor NAD 16 of the donor vehicle 20 to communicate, through the wireless network 22, with, for example, the centralized location 24. Using the BLE device 18 uses less energy from the battery 13.

Utilizing the donor NAD 16 of the donor vehicle 20 to communicate with the centralized location 24, via BLE device 18, on behalf of the recipient vehicle 12 generally saves the charge of the battery 13. Therefore, the recipient vehicle 12 may search for the donor vehicle 20 based on whether the donor vehicle 20 has sufficient telematic energy budget to operate the donor NAD 16. Additionally, the recipient vehicle 12 may request permission from the donor vehicle 20 to communicate via the BLE device 18 and to use the donor NAD 16. Skilled artisans will recognize that the sufficient telematic energy budget may vary based on the battery 13 of the donor vehicle 20, or other factors of either vehicle.

Furthermore, the recipient vehicle 12 may identify the donor vehicle 20 based on driver behavior predictions from the donor vehicle 20. In some instances, the recipient vehicle 12 may use V2V negotiations to communicate with vehicles from a different manufacturer than the recipient vehicle 12 to identify non-manufacturer donor vehicles 20. Then, to determine whether the non-manufacturer donor vehicles 20 are candidates to use the donor NAD 16 of the non-manufacturer donor vehicles 20 to communicate with the centralized location 24 on behalf of the recipient vehicle 12.

Where the recipient vehicle 12 successfully finds a donor vehicle 20 from a different manufacturer, the donor NAD 16 may communicate with the centralized location 24 to temporarily, or permanently, whitelist that donor vehicle 20. Whitelisting may involve the centralized location 24 keeping records that may be used for other recipient vehicles 12 that are from different manufacturers, such that non-manufacturer search process may be sped up for other recipient vehicles 12.

There may be instances in which the communications between the donor vehicle 20 and the recipient vehicle 12 may need to be cut off. For example, and without limitation, the system may interrupt use of the donor NAD 16 if either the donor vehicle 20 exceeds its telematic energy budget and/or the recipient vehicle 12 exits the ignition off state. Note that it is, also, possible that the recipient vehicle 12 so depletes its telematics energy budget that the recipient vehicle 12 is unable to operate its BLE device 18.

In some instances, the method of extending connectivity of the recipient vehicle 12 may include learning whether there is a pattern-based donor vehicle 20 regularly nearby or regularly present in a specific location. The pattern-based donor vehicle 20 would also have a pattern-based donor NAD 16 and a pattern-based donor BLE device 18.

Regularly nearby generally means that the presence of the donor vehicle 20 is not random. Some examples of regularly nearby or regularly present include, without limitation, the donor vehicle 20 being detected by the recipient vehicle 12 during two or more ignition off periods or greater than a percentage (such as 75%) of the ignition off periods of the recipient vehicle 12. Alternatively, and without limitation, the donor vehicle 20 is present during at least half of the days during which the recipient vehicle 12 has an extended ignition off period in the specific location. When the pattern-based donor vehicle 20 is nearby, the methods may set a pattern flag to positive if the pattern-based donor vehicle 20 is nearby.

Note that the regularly nearby example is not limiting, and skilled artisans may select different criteria for determining whether the pattern-based donor vehicle 20 is regularly nearby, including the type of donor vehicle 20 and the type of recipient vehicle 12, in addition to the types of battery 13 in both vehicles. In some cases, the pattern-based donor vehicle 20 may be a vehicle regularly parked in the same location as the recipient vehicle 12, such as the same home garage or office garage. Extended ignition off periods may be considered, without limitation, greater than 4 days, but may also be longer. Note that the recipient vehicle 12 may be making its pattern-based donor list during less than extended ignition off periods. The recipient vehicle 12, if the pattern flag is positive, may use the recipient BLE device 18 to communicate with the pattern-based donor BLE device 18, such that the recipient vehicle 12 uses the pattern-based donor NAD 16 to communicate with the centralized location 24 on its behalf.

In some instances, the recipient vehicle 12 may learn that a plurality of pattern-based donor vehicles 20 are regularly nearby. Therefore, the recipient vehicle 12 creates a pattern-based donor list (or whitelist) from the available BLE device 18 of the pattern-based donor vehicles 20. Then, the recipient vehicle 12 searches for any of the pattern-based donor vehicles 20 on the prepopulated pattern-based donor list and uses a specific pattern-based donor NAD 16 from the pattern-based donor list to communicate with the centralized location 24. If the specific pattern-based donor vehicle 20 leaves the area, the recipient vehicle 12 may find another vehicle from the pattern-based donor list and connect to that vehicle.

Note that the vehicles may negotiate to determine which is the donor vehicle 20 and which is the recipient vehicle 12. Furthermore, the vehicles could flip or swap roles if one has more likely time before leaving the area or one have more charge in the battery 13 left than the other.

Figure 2:
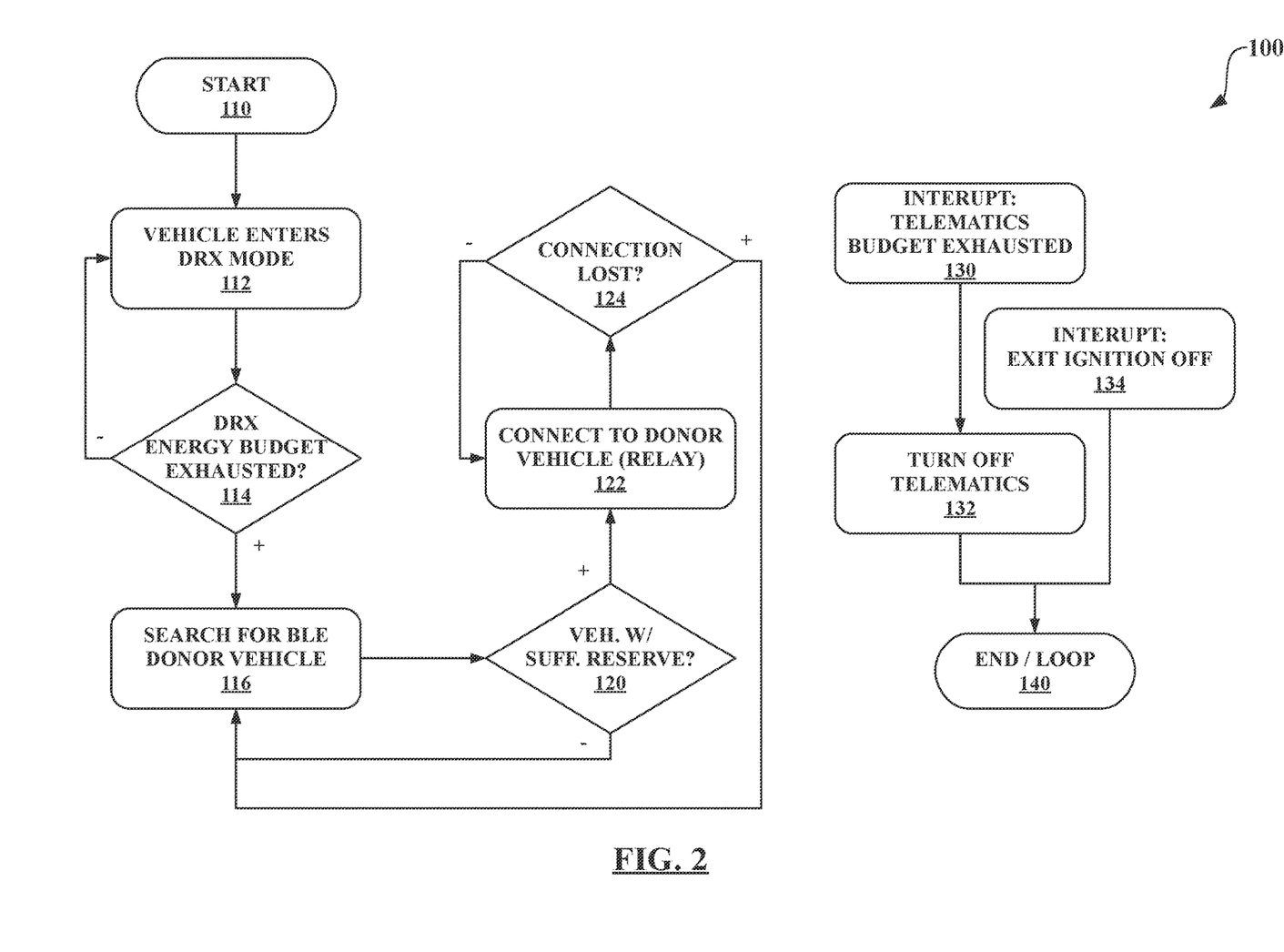
FIG. 2 is a schematic flow chart diagram of a threshold-based selection for extending connectivity.

The flow charts shown schematically in FIGS. 2-5 illustrate some of the steps and processes that may be used to extend connectivity of one or more recipient vehicles 12. Where decision steps are illustrated, positive determinations may be shown by a "+" and negative determinations shown by a "−." None of the steps are required, and many of the steps may be reordered, skipped, or moved, as will be recognized by those having ordinary skill in the art. FIG. 2 is a schematic flow chart diagram of a threshold-based selection for finding, and connecting to, donor vehicles 20, illustrated as a method 100.

Step 110: START. At step 110 the method 100 initializes or starts. The method 100 may begin operation when called upon by the controller 14, may be constantly running, or may be looping iteratively.

Step 112: VEHICLE ENTERS DRX MODE. At step 112 the method 100 enters the DRx mode for the recipient vehicle 12, or another recipient vehicle. The DRx mode shuts down the remaining functions of the telematics module and allows the NAD 16 to operate within the recipient vehicle 12.

Step 114: DRX ENERGY BUDGET EXHAUSTED? At step 114 the method 100 determines whether the energy budget for the DRx mode has expired or is near expiring. Many of the functions of the recipient vehicle 12 may be given an energy budget to prevent complete draining of the energy resources of the battery 13. As will be recognized by skilled artisans, the method 100 may apply threshold for the DRx energy budget, such as around 90 percent but may also use other thresholds.

If the DRx energy budget is not exhausted, the method 100 returns to step 112 and continues the DRx mode. Returning to DRx mode may involve a pause and/or a loop counter. If step 114 determines that the DRx energy budget is exhausted or close to exhausted, the method 100 proceeds to step 116.

Step 116: SEARCH FOR BLE DONOR VEHICLE. At step 116 the method 100 begins looking for a reachable donor vehicle 20. The donor vehicle 20 would generally need to have both donor BLE device 18 and donor NAD 16.

Step 120: VEHICLE WITH ENERGY RESERVE FOUND? At step 120 the method 100 determines whether any donor vehicle 20 within reach of the BLE device 18 has sufficient energy reserves within its battery 13. In general, the BLE device 18 may have a range of up to, or over, 100 meters, although skilled artisans will recognize that different conditions and different objects may limit the BLE device 18 range-proximate may generally be considered anything within the range of BLE device 18. If no donor vehicle 20 with sufficient energy reserves is found, the method 100 returns to step 116 to search for a different donor vehicle 20.

Step 122: CONNECT TO DONOR VEHICLE (RELAY MODE). If a donor vehicle 20 with sufficient energy reserves is found, at step 122 the method 100 begins connecting, via BLE device 18, to the donor vehicle 20. The donor vehicle 20 uses the donor NAD 16 to connect to the centralized location 24, or multiple centralized locations 24, on behalf of the recipient vehicle 12. This may be referred to as a relay mode.

Step 124: DONOR CONNECTION LOST? At step 124 the method 100 determines whether the connection with the donor vehicle 20 has been lost. If the connection has not been lost, the connection is retained at step 122. Returning to step 122 may involve a pause and/or loop counter.

If the connection with the donor vehicle 20 is lost, the method 100 returns to step 116 to continue searching for another donor vehicle 20 that will maintain a proper connection. The donor vehicle 20 connection may be lost, for example and without limitation, because the donor vehicle 20 leaves the area or its telematics budget runs out and shuts down the donor NAD 16.

Steps 130-140 schematically illustrate an interrupt sequence, which may be used, in addition to the method 100, in the other methods described herein. Those having ordinary skill in the art will recognize other factors for which the methods described herein may need to be interrupted.

Step 130: INTERRUPT: TELEMATICS BUDGET EXHAUSTED. At step 130, the method 100 will interrupt if the telematics budget of the recipient vehicle 12 is exhausted. Note that the DRx energy budget of step 116 is a sub budget of the entire telematics budget.

Step 132: TURN OFF TELEMATICS. At step 132, the method 100 turns off all, or substantially all, of the telematics functions. This may likely include the recipient BLE device 18 that was being used to communicate with the donor BLE device 18 and the donor NAD 16.

Step 134: INTERRUPT: EXIT IGNITION OFF. At step 134, the method 100 will interrupt if the recipient vehicle 12 exits its ignition off state. At this point, the recipient vehicle 12 will likely be able to recharge its battery 13.

Step 140: END/LOOP. At step 140, the method 100 ends or loops. The recipient vehicle 12 is either no longer using its telematics equipment because the telematics budget was exhausted or has full power available to use telematics because the ignition off state ended. The end/loop step may then proceed, if necessary, back to the start step 110.

Figure 3:
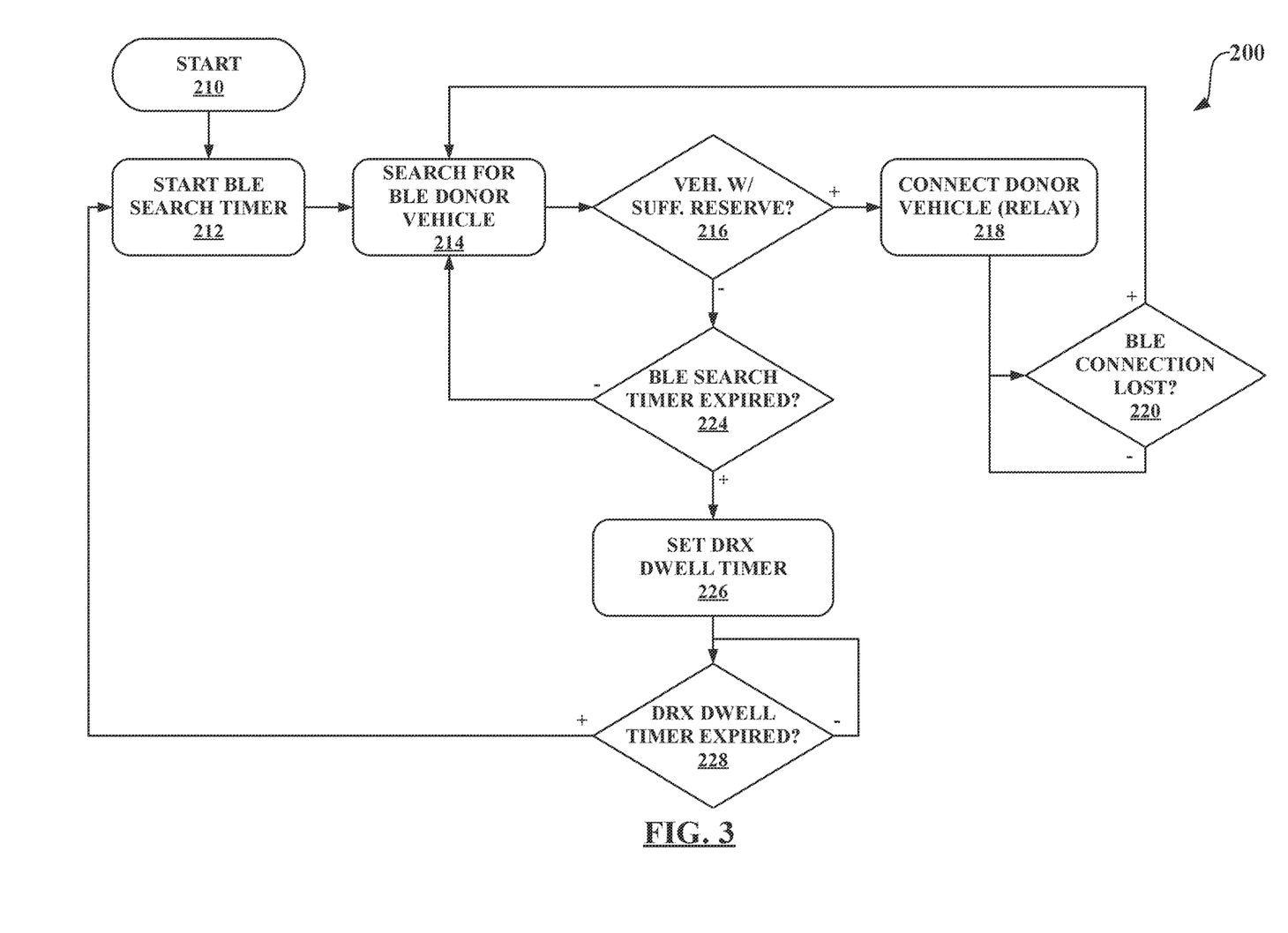
FIG. 3 is a schematic flow chart diagram of a state-of-charge-based selection for extending connectivity.

FIG. 3 is a schematic flow chart diagram of a method 200 for a state-of-charge-based selection for finding, and connecting to, donor vehicles 20. The method 200 may work in concert with the method 100 on the recipient vehicle 12. Additionally, any of the methods described herein may be alternatives executed by the controller 14 of the recipient vehicle 12 or may work together with the method 100.

Step 210: START. At step 210 the method 200 initializes or starts. The method 200 may begin operation when called upon by the controller 14, may be constantly running, or may be looping iteratively.

Step 212: START BLE SEARCH TIMER. At step 212 the method 200 starts a timer to search for possible donor vehicles 20 having BLE device 18. Skilled artisans will recognize the possible lengths of the BLE search timer, depending, at least, on the condition of the recipient vehicle 12 and/or of the battery 13.

Step 214: SEARCH FOR BLE DONOR VEHICLE. At step 214 the method 200, during the pendency of the BLE search timer, looks for the BLE device 18 of possible donor vehicles 20.

Step 216: FOUND VEHICLE WITH SUFFICIENT RESERVE? At step 216 the method 200 determines whether any of the possible donor vehicles 20 have sufficient energy reserves to operate the donor NAD 16. This may involve V2V communications with the potential donor vehicles 20 to determine whether the battery 13—of whichever type— has sufficient energy capacity. If a donor vehicle 20 with sufficient reserve is found, the method 200 moves to step 218.

Step 218: CONNECT TO DONOR VEHICLE (RELAY MODE). At step 218 the method 200 begins connecting, via BLE device 18, to the donor vehicle 20 that was determined to have sufficient energy reserves. The donor vehicle 20 uses the donor NAD 16 to connect to the centralized location 24, or multiple centralized locations 24, on behalf of the recipient vehicle 12.

Step 220: BLE CONNECTION LOST? At step 220 the method 200 determines whether the BLE device 18 connection to the donor vehicle 20 has been lost. If the connection is lost, the method 200 restarts and begins searching for a different donor vehicle 20. If the connection is maintained with the donor vehicle 20, the method 200 iteratively loops and rechecks the connection, which may involve a pause or counter.

Step 224: BLE SEARCH TIMER EXPIRED? If step 216 finds no donor vehicle 20 with sufficient reserves of energy, the method 200 proceeds to step 224. At step 224, the method 200 determines whether the BLE search timer has expired. If the timer has not expired, the method 200 returns to step 216 to continue searching for the donor vehicle 20.

Step 226: SET DRX DWELL TIMER. If the search timer has expired, the method 200 proceeds to step 226 and sets a DRx dwell timer. Because the DRx energy budget has not yet expired, the method 200 may immediately began looking for a donor vehicle 20. The recipient vehicle 12 may continue in DRx mode and use the recipient NAD 16 for at least some period, such that the DRx dwell timer is set. The DRx dwell timer may be as low as 30 minutes, but skilled artisans will recognize that differing conditions, and different types or capacities of battery 13, may require shorter or longer DRx dwell timers.

Step 228: DRX DWELL TIMER EXPIRED? At step 228, the method 200 determines whether the DRx dwell timer has expired. If the timer has not expired, the method 200 loops until the timer expires, which may include a pause or delay before checking again. If the timer has expired, the method 200 returns to step 212 to start a new BLE search timer and proceeds to look for a donor vehicle 20 with sufficient reserve energy.

The interrupt sequence illustrated by steps 130-140 of the method 100 shown in FIG. 2 may also apply, with similar factors, to the method 200 shown in FIG. 3. Those having ordinary skill in the art will recognize other factors for which the methods described herein may need to be interrupted.

Figure 4A:
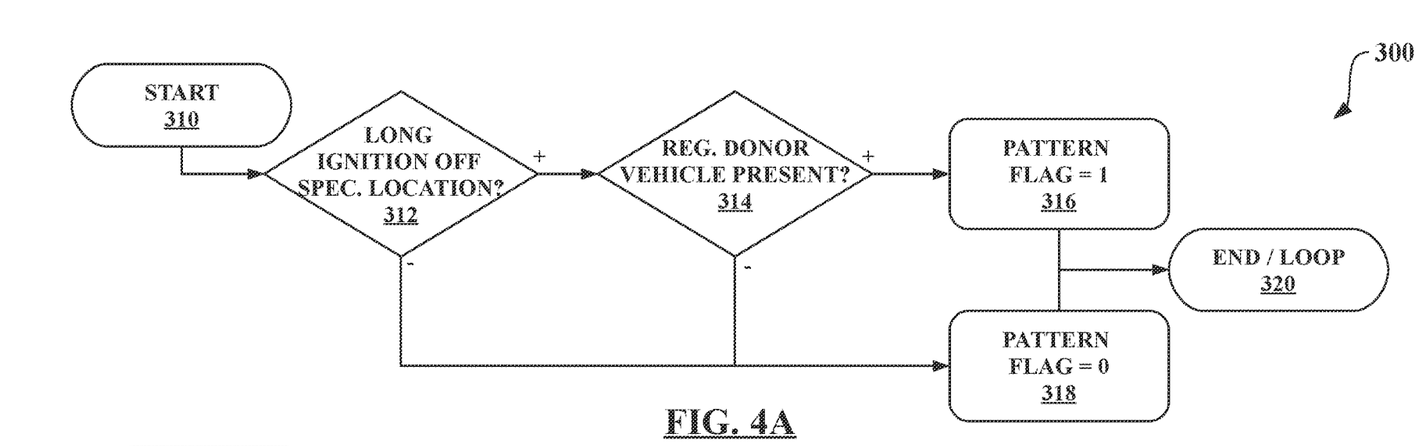
FIG. 4A is a schematic flow chart diagram of a pattern-based selection learning mode.
Figure 4B:
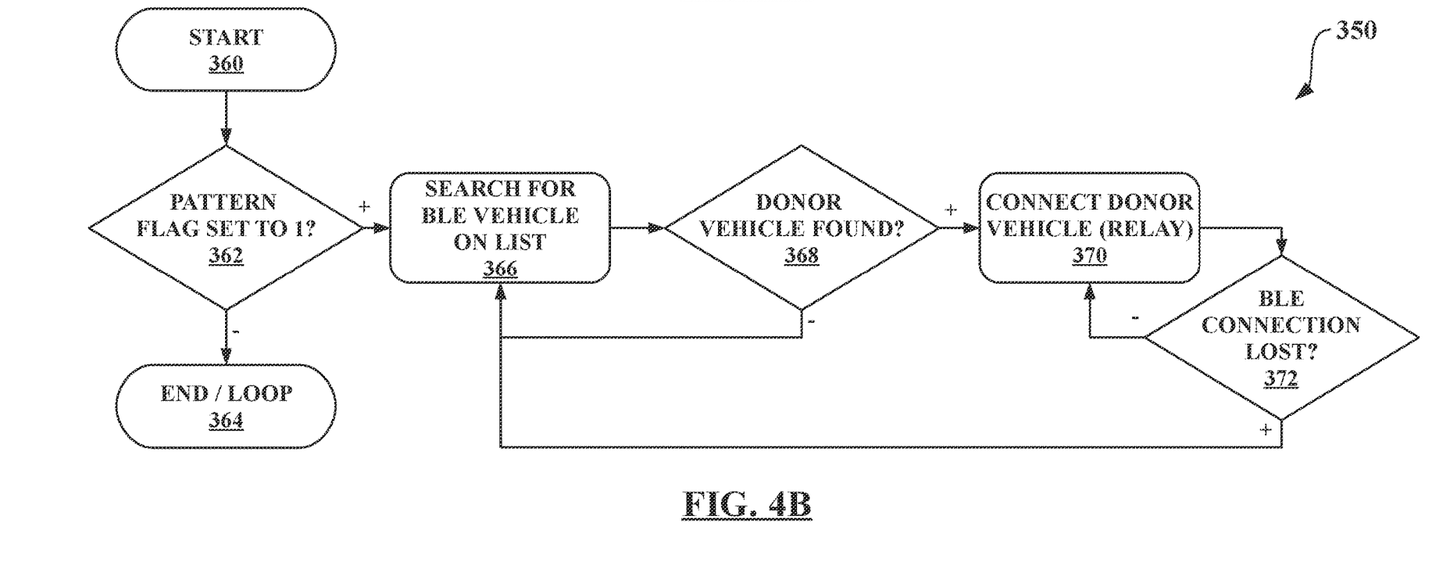
FIG. 4B is a schematic flow chart diagram of the pattern-based selection search and relay mode for extending connectivity.

FIG. 4A is a schematic flow chart diagram of a pattern-based selection learning mode shown as a method 300, and FIG. 4B is a schematic flow chart diagram of a pattern-based selection search and relay mode shown as a method 350. These methods look for, and may connect with, pattern-based donor vehicles 20 that are regularly nearby in a specific location of the recipient vehicle 12. For example, and without limitation, the pattern-based donor vehicle 20 may be a vehicle regularly parked in the same location as the recipient vehicle 12, such as the same home garage or office garage.

Step 310: START. At step 310 the method 300 initializes or starts. The method 300 may begin operation when called upon by the controller 14, may be constantly running, or may be looping iteratively.

Step 312: LONG IGNITION OFF IN SPECIFIC LOCATION? At step 312 the method 300 determines whether the recipient vehicle 12 has long ignition off periods in a specific location. The location of the recipient vehicle 12 may be determined by many methods, as would be recognized by skilled artisans, including, without limitation, GPS incorporated into navigation systems or smart devices. Long ignition off periods may be considered, without limitation, greater than 4 days, but may also be longer, depending on the specific vehicle, as will be recognized by skilled artisans.

Step 314: REGULAR DONOR VEHICLE PRESENT? If step 312 determines that there are long ignition off periods in a specific location, the method 300 proceeds to step 314. At step 314 the method 300 determines whether there is a regularly present donor vehicle 20 that the recipient vehicle 12 may utilize for communications.

Regularly nearby or present may include, without limitation, at least half of the days during which the recipient vehicle 12 has an extended ignition off period in the specific location. Note that, depending on the specific recipient vehicle, and the specific location, other pattern-based selection criteria may be used, as would be recognized by skilled artisans.

Step 316: SET PATTERN FLAG TO 1. If step 314 determines that there is a donor vehicle regularly present, the method 300 proceeds to step 316. At step 316 the method 300 sets a pattern flag to 1—i.e., the pattern flag is positive.

Step 318: SET PATTERN FLAG TO 0. If either step 312 determines that there are no long ignition off periods in a specific location or step 316 determines that there is no donor vehicle regularly present, the method 300 proceeds to step 318. At step 318 the method 300 sets a pattern flag to 0—i.e., the pattern flag is negative.

Step 320: END/LOOP. After setting the pattern flag to either positive or negative, the method 300 ends or loops.

Step 360: START. At step 360 the method 350 initializes or starts. The method 350 may begin operation when called upon by the controller 14, may be constantly running, or may be looping iteratively. The method 350 generally determines whether one of the pattern-based donor vehicles 20 is nearby and connects thereto.

Step 362: PATTERN FLAG SET TO 1? At step 362 the method 350 determines whether the pattern flag is in the positive state, such that there is likely a pattern-based donor vehicle 20 nearby.

Step 364: END/LOOP. If the pattern flag is not positive, the method 350 ends or loops. The recipient vehicle 12 may utilize one of the other methods described herein to search for a nearby donor vehicle 20. Alternatively, recipient vehicle 12 may pause and then check for the positive pattern flag after a reasonable time period, as would be recognized by skill artisans.

Step 366: SEARCH FOR BLE VEHICLE ON PATTERN-BASED LIST. If the pattern flag is positive, the method 350 proceeds to step 366, where the method 350 looks for a known pattern-based donor vehicle 20. The recipient vehicle 12 would have a pre-populated list of pattern-based donor vehicles 20 stored, such that it may quickly determine whether one is nearby. Alternatively, the recipient vehicle 12 may communicate with the centralized location 24 to determine the list of pattern-based donor vehicles 20.

Step 368: DONOR VEHICLE FOUND? At step 368 the method 350 determines whether the one of the pattern-based donor vehicles 20 is nearby. If there is no donor vehicle 20 found, the method 350 loops back to step 366, possibly with a pause or time delay, to search for additional pattern-based donor vehicles 20.

Step 370: CONNECT TO DONOR VEHICLE (RELAY MODE). If the donor vehicle 20 is found, the method 350 connects to that pattern-based donor vehicle 20. The recipient vehicle 12 may use the recipient BLE device 18 to communicate with the pattern-based donor BLE device 18, such that the recipient vehicle 12 uses the pattern-based donor NAD 16 to communicate with the centralized location 24. In one ideal situation, and without limitation, the pattern-based donor vehicle 20 may be an electric vehicle that is plugged into a charger, such that the pattern-based donor vehicle 20 has a substantially unlimited supply of energy for its telematics.

Step 372: BLE CONNECTION LOST? At step 372 the method 350 determines whether the BLE device 18 connection to the pattern-based donor vehicles 20 has been lost. If not lost, the method 350 continues the relay mode. However, if the connection is lost, the method 350 returns to step 366 to search for another pattern-based donor vehicle 20 on the list.

Note that there may be a list of donor vehicles 20 detected maintained. Therefore, the donor vehicles 20 may be prioritized, such that a donor vehicle 20 that has been seen twenty times is much more likely to be present and available than those only seen a few times. The recipient vehicle 12 may search for the prioritized donor vehicle(s) 20 before looking for vehicles that are less likely to be present.

The interrupt sequence illustrated by steps 130-140 of the method 100 shown in FIG. 2 may also apply, with similar factors, to the method 300 shown in FIG. 4A and the method 350 shown in FIG. 4B. Those having ordinary skill in the art will recognize other factors for which the methods described herein may need to be interrupted.

Figure 5:
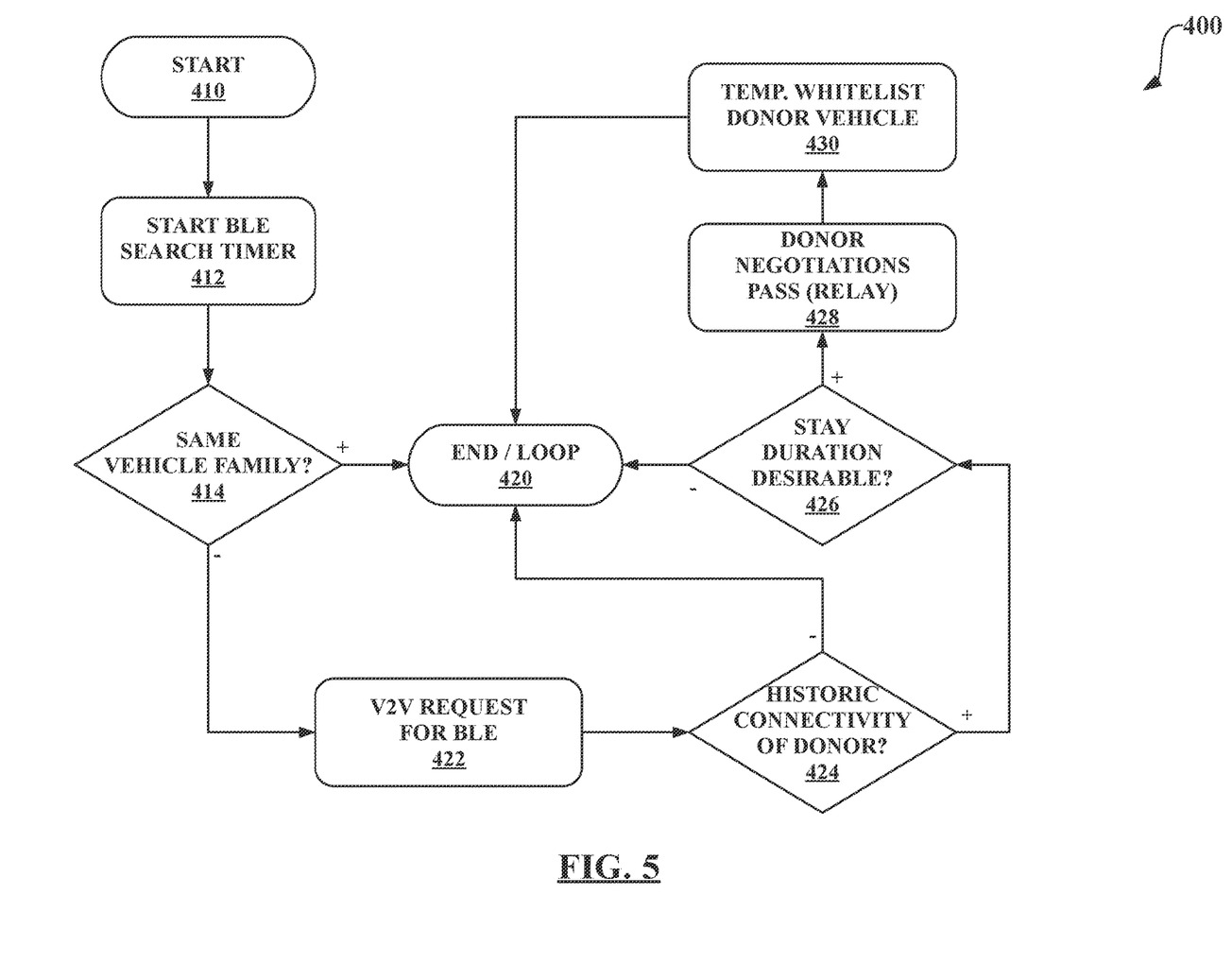
FIG. 5 is a schematic flow chart diagram of a non-manufacturer negotiation using vehicle-to-vehicle (V2V) communications for extending connectivity.

FIG. 5 is a schematic flow chart diagram of a non-manufacturer negotiation using vehicle-to-vehicle (V2V) communications, represented by a method 400. V2V communications are often used to wirelessly exchange information about the speed and position of surrounding vehicles, such that they may help to avoid accidents, ease traffic congestion, and improve the environment. The method 400 uses V2V communications to communicate with vehicles of a different manufacturer than the recipient vehicle 12 and determine whether the non-manufacturer vehicles may be used as donor vehicles 20 to provide communication for the recipient vehicle 12.

Step 410: START. At step 410 the method 400 initializes or starts. The method 400 may begin operation when called upon by the controller 14, may be constantly running, or may be looping iteratively.

Step 412: START BLE SEARCH TIMER. At step 412 the method 400 starts a timer to search for possible donor vehicles 20. Skilled artisans will recognize the possible lengths of the BLE search timer, depending, at least, on the condition of the recipient vehicle 12 and/or the charge of the battery 13.

Step 414: SAME VEHICLE FAMILY? At step 414 the method 400 determines whether the possible donor vehicle 20 is from the same manufacturing family as the recipient vehicle 12. If the donor vehicle 20 is from the same family as the recipient vehicle 12, there may not be a reason to use the V2V communications systems, as the same family vehicles may already be configured to communicate directly via built in mechanisms.

Step 420: END/LOOP. If the method 400 determines that both vehicles are from the same family, the method 400 ends or loops. The recipient vehicle 12 may utilize one of the other methods described herein to search for a nearby donor vehicle 20 or simply connect to the found donor vehicle 20 in the relay mode.

Step 422: V2V REQUEST FOR BLE. At step 422 the method 400 sends a V2V communications request to the donor vehicle 20 to begin asking for the donor BLE device 18. Then the method 400 proceeds to steps 424 and 426, which may be considered donor negotiation conditions.

Step 424: HISTORIC CONNECTIVITY OF DONOR? At step 424 the method 400 determines whether the possible donor vehicle 20, or vehicles from its manufacture, has previously allowed donor connectivity with vehicles of the same family as the recipient vehicle 12, or with the specific recipient vehicle 12 involved. This may involve communicating with the centralized location 24 or drawing upon a list stored within the recipient vehicle 12. If the method 400 determines that the possible donor vehicle 20 is unlikely to allow connectivity, the method 400 ends or loops.

Step 426: STAY DURATION DESIRABLE? At step 426 the method 400 determines whether the possible donor vehicle 20 is likely to stay nearby the recipient vehicle 12 for a reasonable amount of time. Skilled artisans will recognize the desirable amount of time based on the conditions of the possible donor vehicle 20, the recipient vehicle 12, and/or their respective batteries 13. If the stay duration is not desirable, the method 400 ends or loops.

Step 428: DONOR NEGOTIATIONS PASS AND RELAY MODE. If both steps 424 and 426 are positively answered, the donor negotiations conditions have been satisfied. Therefore, the method 400 connects to the donor vehicle 20 via BLE device 18 and uses its donor NAD 16 to communicate with the centralized location(s) 24.

Step 430: TEMPORARILY WHITELIST DONOR VEHICLE. After connecting to the donor vehicle 20, the method 400 may temporarily whitelist the donor vehicle 20 for use by other recipient vehicles 12 from the same manufacturing family or for subsequent use by the same recipient vehicle 12. The duration of time on the whitelist will depend on the conditions and likelihood of reuse of the non-manufacturer donor vehicle 20, as will be recognized by skilled artisans. This may involve using the donor NAD 16 to communicate with the centralized location 24 to populate the whitelist. Following the temporary whitelist, the method 400 ends or loops.

The interrupt sequence illustrated by steps 130-140 of the method 100 shown in FIG. 2 may also apply, with similar factors, to the method 400 shown in FIG. 5. Those having ordinary skill in the art will recognize other factors for which the methods described herein may need to be interrupted.

Note that, for any, and all of, the methods described herein, the vehicles may negotiate to determine which is the donor vehicle 20 and which is the recipient vehicle 12. Furthermore, the vehicles could flip or swap roles if one has more likely time before leaving the area or one have more charge in the battery 13 left than the other.

The detailed description and the drawings or figures are supportive and descriptive of the subject matter herein. While some of the best modes and other embodiments have been described in detail, various alternative designs, embodiments, and configurations exist.

Furthermore, any examples shown in the drawings or the characteristics of various examples mentioned in the present description are not necessarily to be understood as examples independent of each other. Rather, it is possible that each of the characteristics described in one of the examples of an embodiment can be combined with one or a plurality of other desired characteristics from other examples, resulting in other examples not described in words or by reference to the drawings. Accordingly, such other examples fall within the framework of the scope of the appended claims.

The invention claimed is:

1. A method of extending connectivity of a recipient vehicle, comprising:
   during an ignition off state of the recipient vehicle, disabling a recipient cellular network access device (NAD) of the recipient vehicle;
   connecting the recipient vehicle to a low power communications source, the low power communications source including a recipient Bluetooth® low energy (BLE) device located within the recipient vehicle; and
   communicating with a centralized location over the low power communications source on behalf of the recipient vehicle, via a donor NAD and a donor BLE device of a donor vehicle, wherein the donor vehicle is located proximate the recipient vehicle.

2. The method of extending connectivity of a recipient vehicle of claim 1, further comprising:
   searching for the donor vehicle based on whether the donor vehicle has sufficient telematic energy budget to operate the donor NAD; and
   requesting permission from the donor vehicle to communicate via the donor BLE and to use the donor NAD.

3. The method of extending connectivity of a recipient vehicle of claim 1, further comprising:
   identifying the donor vehicle based on driver behavior predictions from the donor vehicle.

4. The method of extending connectivity of a recipient vehicle of claim 3, further comprising:
   using vehicle-to-vehicle (V2V) negotiations to communicate with vehicles from a different manufacturer than the recipient vehicle to identify non-manufacturer donor vehicles; and
   determining whether the non-manufacturer donor vehicles are candidates to use the donor NAD of the non-manufacturer donor vehicles to communicate with the centralized location on behalf of the recipient vehicle.

5. The method of extending connectivity of a recipient vehicle of claim 4, further comprising:
   temporarily whitelisting donor vehicles from the different manufacturer.

6. The method of extending connectivity of a recipient vehicle of claim 1, further comprising:
   interrupting the donor NAD if the donor vehicle exceeds its telematic energy budget.

7. The method of extending connectivity of a recipient vehicle of claim 1, further comprising:
   determining whether there is a pattern-based donor vehicle regularly nearby in a specific location,
       wherein the pattern-based donor vehicle includes a pattern-based donor NAD and a pattern-based donor BLE device, and
       wherein regularly nearby includes the donor vehicle being detected by the recipient vehicle during two or more ignition off periods in the specific location; and
   setting a pattern flag to positive if the pattern-based donor vehicle is nearby.

8. The method of extending connectivity of a recipient vehicle of claim 7, wherein, if the pattern flag is positive:
   using the recipient BLE device to communicate with the pattern-based donor BLE device; and
   using the pattern-based donor NAD to communicate with the centralized location.

9. The method of extending connectivity of a recipient vehicle of claim 8, wherein the pattern-based donor vehicle is one of a plurality of pattern-based donor vehicles and the recipient vehicle creates a pattern-based donor list from the available pattern-based donor vehicles, and further comprising:
   searching for any of the pattern-based donor vehicles on the pattern-based donor list; and
   using a specific pattern-based donor NAD from the pattern-based donor list to communicate with the centralized location.

10. The method of claim 1, wherein the ignition off state is greater than 10 days.

11. The method of claim 1, further comprising:
interrupting the donor NAD if the recipient vehicle exits the ignition off state.

12. A non-transitory computer-readable storage medium on which is recorded instructions, wherein execution of the instructions by a processor causes the processor to:
during an ignition off state of a recipient vehicle, disable a recipient cellular network access device (NAD) of the recipient vehicle, such that the recipient vehicle is unable to communicate with a centralized location via the recipient NAD;
utilize a recipient Bluetooth® low energy (BLE) device within the recipient vehicle to search for a donor vehicle proximate the recipient vehicle, wherein the donor vehicle includes a donor NAD and a donor BLE device; and
utilize the donor NAD of the donor vehicle to communicate with the centralized location on behalf of the recipient vehicle.

13. The non-transitory computer-readable storage medium of claim 12, wherein execution of the instructions by a processor causes the processor to:
search for the donor vehicle based on whether the donor vehicle has sufficient telematic energy budget to operate the donor NAD; and
request permission from the donor vehicle to communicate via the donor BLE device and to use the donor NAD.

14. The non-transitory computer-readable storage medium of claim 12, wherein execution of the instructions by a processor causes the processor to:
determine whether there is a pattern-based donor vehicle regularly nearby in a specific location, wherein the pattern-based donor vehicle includes a pattern-based donor NAD and a pattern-based donor BLE device, and wherein regularly nearby includes the donor vehicle being detected by the recipient vehicle during two or more ignition off periods in the specific location; and
set a pattern flag to positive if the pattern-based donor vehicle is nearby.

15. The non-transitory computer-readable storage medium of claim 14, wherein execution of the instructions by a processor causes the processor to:
use the recipient BLE device to communicate with the pattern-based donor BLE device; and
use the pattern-based donor NAD to communicate with the centralized location.

16. The non-transitory computer-readable storage medium of claim 15, wherein the pattern-based donor vehicle includes a plurality of pattern-based donor vehicles and the recipient vehicle creates a pattern-based donor whitelist from the available pattern-based donor vehicles, and wherein the execution of the instructions by a processor causes the processor to:
search for any of the pattern-based donor vehicles on the pattern-based donor whitelist; and
use a specific pattern-based donor NAD from the pattern-based donor whitelist to communicate with the centralized location.

17. The non-transitory computer-readable storage medium of claim 12, wherein execution of the instructions by a processor causes the processor to:
identify the donor vehicle based on driver behavior predictions from the donor vehicle.

18. The non-transitory computer-readable storage medium of claim 12, wherein execution of the instructions by a processor causes the processor to:
use vehicle-to-vehicle (V2V) negotiations to communicate with vehicles from a different manufacturer than the recipient vehicle to identify non-manufacturer donor vehicles;
determine candidates for use of the donor NAD of one of the non-manufacturer donor vehicles to communicate, such that the one non-manufacturer donor vehicle communicates with the centralized location; and
determine a likely amount of time that the non-manufacturer donor vehicles will be near the recipient vehicle.

19. The non-transitory computer-readable storage medium of claim 12, wherein the ignition off state is greater than 10 days.

20. The non-transitory computer-readable storage medium of claim 12, wherein execution of the instructions by a processor causes the processor to interrupt the donor NAD if the recipient vehicle exits the ignition off state.

* * * * *